US00RE43458E

(19) United States
(12) Reissued Patent
Cleland

(10) Patent Number: US RE43,458 E
(45) Date of Reissued Patent: Jun. 12, 2012

(54) TABLE TOP REFRIGERATED BEVERAGE DISPENSER

(76) Inventor: James M. Cleland, Cypress, CA (US)

(21) Appl. No.: 12/622,447

(22) Filed: Nov. 20, 2009

Related U.S. Patent Documents

Reissue of:
(64) Patent No.: 7,296,428
Issued: Nov. 20, 2007
Appl. No.: 10/984,234
Filed: Nov. 8, 2004

U.S. Applications:
(63) Continuation-in-part of application No. 10/705,774, filed on Nov. 10, 2003, now abandoned.

(51) Int. Cl.
*F25B 41/04* (2006.01)
*F25B 49/00* (2006.01)

(52) U.S. Cl. ..... 62/196.1; 62/224; 62/394; 62/513

(58) Field of Classification Search ..... 62/151, 62/155, 196.1, 196.3, 196.4, 197, 200, 217, 62/224, 225, 277, 278, 389, 394, 395, 396, 62/210, 228.5
See application file for complete search history.

(56) References Cited

U.S. PATENT DOCUMENTS 3,619,668 A * 11/1971 Pinckaers ..... 327/397
3,643,754 A * 2/1972 Brandin et al. ..... 62/196.4
3,791,161 A * 2/1974 Kramer ..... 62/226
4,272,970 A * 6/1981 Hobbs ..... 62/511
5,524,452 A * 6/1996 Hassell et al. ..... 62/389
5,649,431 A * 7/1997 Schroeder, Jr. ..... 62/434
6,192,695 B1 * 2/2001 Hirota ..... 62/196.4
6,360,556 B1 * 3/2002 Gagliano ..... 62/396
6,523,360 B2 * 2/2003 Watanabe et al. ..... 62/204
6,711,910 B2 * 3/2004 Ziolkowski et al. ..... 62/196.4

FOREIGN PATENT DOCUMENTS

| | | |
|---|---|---|
| GB | 1110041 | 4/1968 |
| JP | 03-083232 | 4/1993 |
| JP | 06-115594 | 4/1994 |

* cited by examiner

*Primary Examiner* — Marc Norman
(74) *Attorney, Agent, or Firm* — Fulwider Patton LLP

(57) ABSTRACT

A self-contained beverage chilling apparatus including a refrigerant cooling system comprising a refrigerant reservoir in a fluid communication with a cold plate, a refrigerator accumulator, a compressor and a refrigerant condenser mounted within a housing unit. The housing unit further included beverage inlet means in fluid communication with the cooling system cold plate, and beverage dispenser means in fluid communication with the cold plate wherein the beverage to be dispensed is chilled to a desired temperature as it passes through the cold plate to the beverage dispensing means.

9 Claims, 9 Drawing Sheets

TABLE TOP REFRIGERATED BEVERAGE DISPENSER

Matter enclosed in heavy brackets [ ] appears in the original patent but forms no part of this reissue specification; matter printed in italics indicates the additions made by reissue.

RELATED APPLICATIONS

This application is a continuation-in-part application of pending application Ser. No. 10/705,774 filed on Nov. 10, 2003 now abandoned.

BACKGROUND OF THE INVENTION

1. Field of the Invention

The present invention is related generally to beverage dispensing systems employing a cooling subsystem, and more particularly to a self-contained, table top beverage dispenser incorporating a refrigerant-chilled cold plate for cooling the beverage.

2. Description of Related Art

In a large number of restaurants, taverns, pubs, and clubs where beer is sold at a bar, beer kegs are stored in a cold room where they can be maintained at a reduced temperature along with other perishable food items and beverages. These cold rooms are typically maintained at a temperature of approximately 40° F. The beer is conducted from the cold rooms to serving towers at the bar through plastic tubes or beer lines that extend within a thermally insulated jacket, or trunk line. The distance between the cold room and the tower can be as little as fifteen feet and as great as two hundred feet, depending on the layout of the particular establishment. To move the beer through the lines, such systems require a pressurization subsystem that forces the beer from the cold room down the length of beer line to the beer tower for dispensing. The pressurization subsystem introduces a gas such as nitrogen or carbon dioxide into the beverage, pressurizing the beverage to enable it to be pumped through the beer lines.

As the beer is communicated from the cold room to the dispensing tower, it gains heat from the ambient atmosphere and warms to a temperature above the original 40° F. Even enveloped in the thermally insulated trunk line, traveling seventy five feet the beer in the trunk line can result in a beer temperature increase of 8° F. at the end of the trunk line. Thus, where the length of the beer lines from the cold room to the dispensing towers is not minimal, the beer dispensing system will traditionally include one or more refrigerated glycol chillers that incorporate glycol re-circulating lines of plastic tubing that extend within the thermally insulated trunk line carrying the beer lines. The presence of the glycol recirculation lines can reduce the warming of the beer by five to six degrees, resulting in an end temperature as low as 42° F., or a two degree rise from cold room to the end of the trunk line.

The trunk lines may lead to a counter top supporting cabinetry such that their downstream ends terminate below the counter tops, where they connect with balance lines that extend from the down stream end of the trunk line to the delivery tubes adjacent the respective dispensing valve. In practice the beer flowing from the beer lines, through the balance lines and stainless steel tubes can be expected to further warm from 2° F. to 4° F. Accordingly, in the example above beer initially at 40° F. in the cold room is warmed to 42° F. at the downstream end of the trunk line, and further warmed to approximately 45° F. by the time it reaches the dispensing valve.

When beer is charged with a gas such as carbon dioxide to move the beer through the various lines, the gas is entrained or dissolved in the fluid and resides in a stable state for temperatures below or at approximately 30° F. That is, the gas does not bubble out of the fluid but is carried by the fluid and gives the beverage its distinctive effervescence when consumed. However, as the temperature of the beer rises above 30° F., absent an increase in pressure on the system, the gas gradually becomes increasingly unstable and begins to bubble or foam out of the flowing beer. Further warming of the beer increases the foaming effect as the gas bubbles coalesce and propagate downstream, and foaming is further exacerbated by disturbances in the beer such as the turbulence generated when the beer is dispensed from the dispensing valve. When beer is warmed to 45° F. or more, when exposed to normal ambient room pressure, the gas becomes so unstable and so much foam is generated when it is dispensed through the valves that it can often times cannot be served to patrons. As a result, the beer dispensed through the valve must be discarded as waste resulting in significant erosion of the owner's profit.

In the recent past, the purveyors of beer using systems such as that described above have resorted to the inclusion of jacketed heat exchangers in the beer distribution systems just prior to the dispensing valves to chill beer to a low temperature at the down stream end of the trunk lines. The heat exchangers are thermally insulated cast aluminum or aluminum alloy cold plates that incorporate stainless steel tubular beer conducting coils for communicating beer from the downstream end of the trunk lines to the upstream end of the balance lines. Within the cold plates next to the beer conducting coils are a series of coolant re-circulating coils used to remove heat from the beer in a heat exchanger relationship. Typically the coolant used in such systems has been glycol.

The chilled glycol carries heat away from the cold plate and the beer lines within the cold plate in a continuous manner to lower the temperature of the beer entering the balance lines. If the glycol is chilled to, for example, 28° or 29° F. where it enters the cold plate it can be expected that the beer flowing through the cold plate will be chilled to about 29° F. In such case, the beer as it leaves the cold plate will be conducted to the dispensing valve via the balance lines and will be dispensed at about 29° F. At this temperature, the generation of foam can be minimal if attention and care is applied when the delivery is carried out through the dispensing valve and profits can be preserved.

A system such as that described above is disclosed in U.S. Pat. No. 5,694,787, entitled "Counter Top Beer Chilling Dispensing Tower," issued Dec. 9, 1997 and which the present inventor was a co-inventor. The '787 patent described a glycol recirculating coil unit or basket including elongate tubular glycol inlet and outlet tube sections having upstream ends connected to an upstream manifold and downstream ends connected to a downstream manifold.

Although the system disclosed in the '787 patent provided for a counter-top chilling and dispensing apparatus, it required the use of a glycol reservoir and glycol pump which take up significant space and require proper maintenance for efficient operation.

A need therefore exists for a tabletop chilled beverage dispensing system which is compact, easy to maintain and does not require the utilization of a glycol reservoir or pump.

SUMMARY OF THE INVENTION

The present invention is directed to a beverage dispensing system for dispensing chilled beverages comprising a housing with one or more beverage inlet connections extending from said housing and one or more beverage dispensers extending from said housing. A beverage cooling system is positioned within said housing, said cooling system comprising a reservoir containing a supply of refrigerant, a cold plate in fluid communication with said refrigerant reservoir wherein the refrigerant lines extend through said cold plate. The cooling system further includes an accumulator, a compressor, a refrigerant condenser and a thermal expansion valve positioned between said refrigerant reservoir and said cold plate to adjust the flow of refrigerant depending upon the temperature of the cold plate, wherein beverage lines extend between said beverage inlet connections and beverage dispensing outlets, said beverage lines passing through said cold plate in a heat exchange relationship with the refrigerant lines.

An electronic control system is provided for controlling the operation of the beverage cooling system. The electronic control system includes an on/off switch controlling the operation of the beverage dispenser, and a pressure switch controlling the operation of the compressor. A second pressure switch is provided for controlling the beverage evaporator coil, a liquid line coil and a time delay relay. A manual defrost switch is provided for operating a defrost line in the event the cold plate becomes frozen.

Alternate embodiments of the present invention may utilize a differing beverage cooling system wherein the system is controlled or monitored by a thermostatic control which monitors the temperature of the cold plate. Alternatively, flow of refrigerant to the cold plate may be controlled by means of a hot gas valve which diverts the flow of refrigerant from the cold plate or a pressure switch connected to the suction side of the compressor.

DETAILED DESCRIPTION OF THE INVENTION

Figure 1:
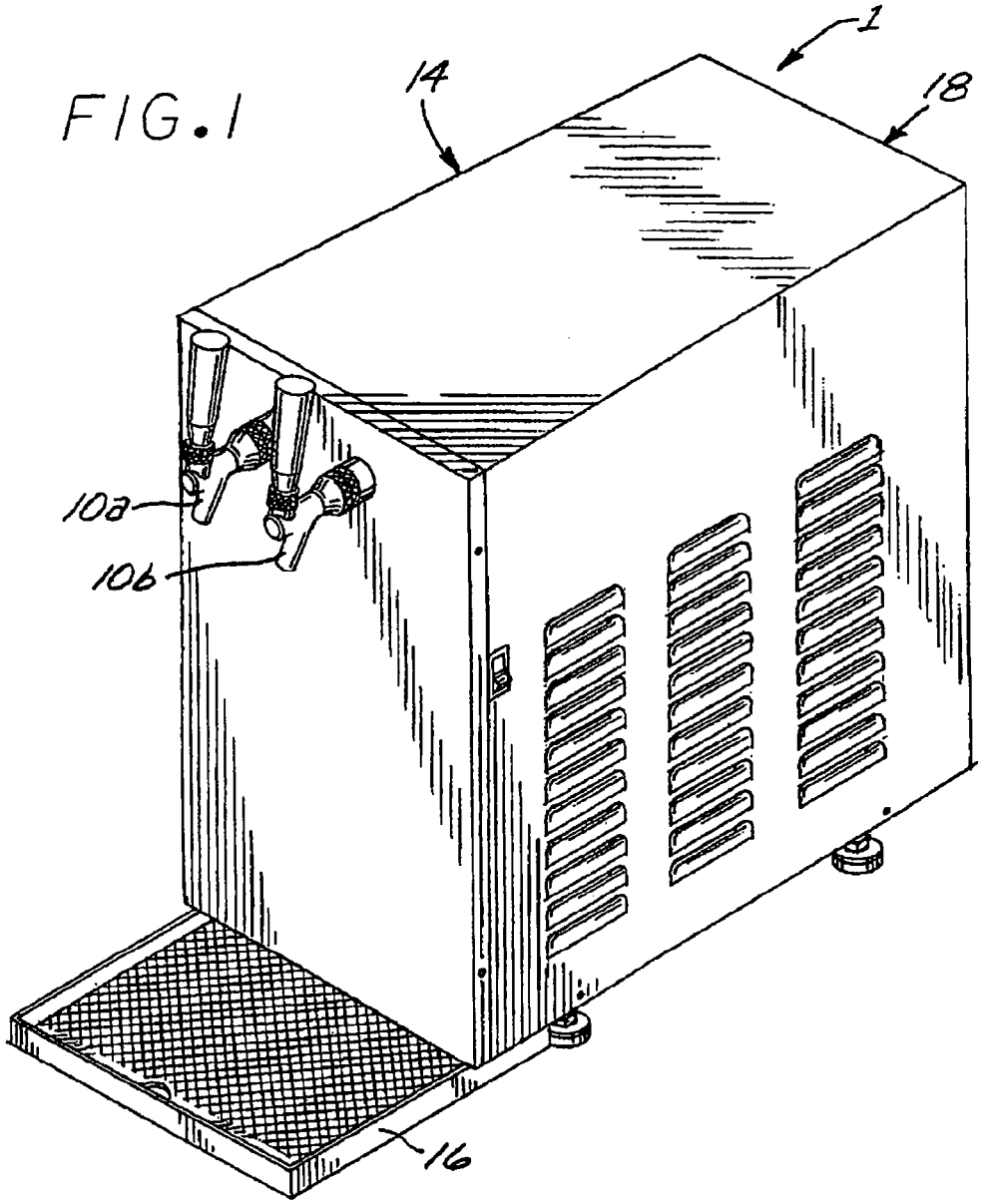
FIG. 1 is a perspective view of the subject invention.

The stand alone, self-contained beverage dispenser 1 of the present invention is shown in FIG. 1. Although the subject invention will be described in the context of the beverage to be dispensed being beer, it is to be understood that the invention is not limited to the dispensing of beer. The dispenser of the subject invention may be utilized to chill and dispense any other beverage that may be desired. Beverage dispensing outlets 10a and b extend out of the front end of housing 14. The beverage dispensing outlets may be beer taps or other such dispensers known to those skilled in the art. A beverage spill tray 16 is positioned beneath the dispensing outlets 10a and b.

Beverage dispenser 1 may be mounted on a counter-top or other support surface. Beverage inlet connections (not shown) are provided on the rear 18 of beverage dispenser 1. The beverage dispenser 1 may be easily installed at the desired location. One need simply run the beverage lines from the beverage supply, i.e. beer keg, to the location for connection to the beverage dispenser unit.

A refrigerant cooling system 20 is contained within the housing 14 so as to provide a self-contained beverage dispenser which does not require a separate glycol chiller and pump as required in prior art systems.

Figure 2:
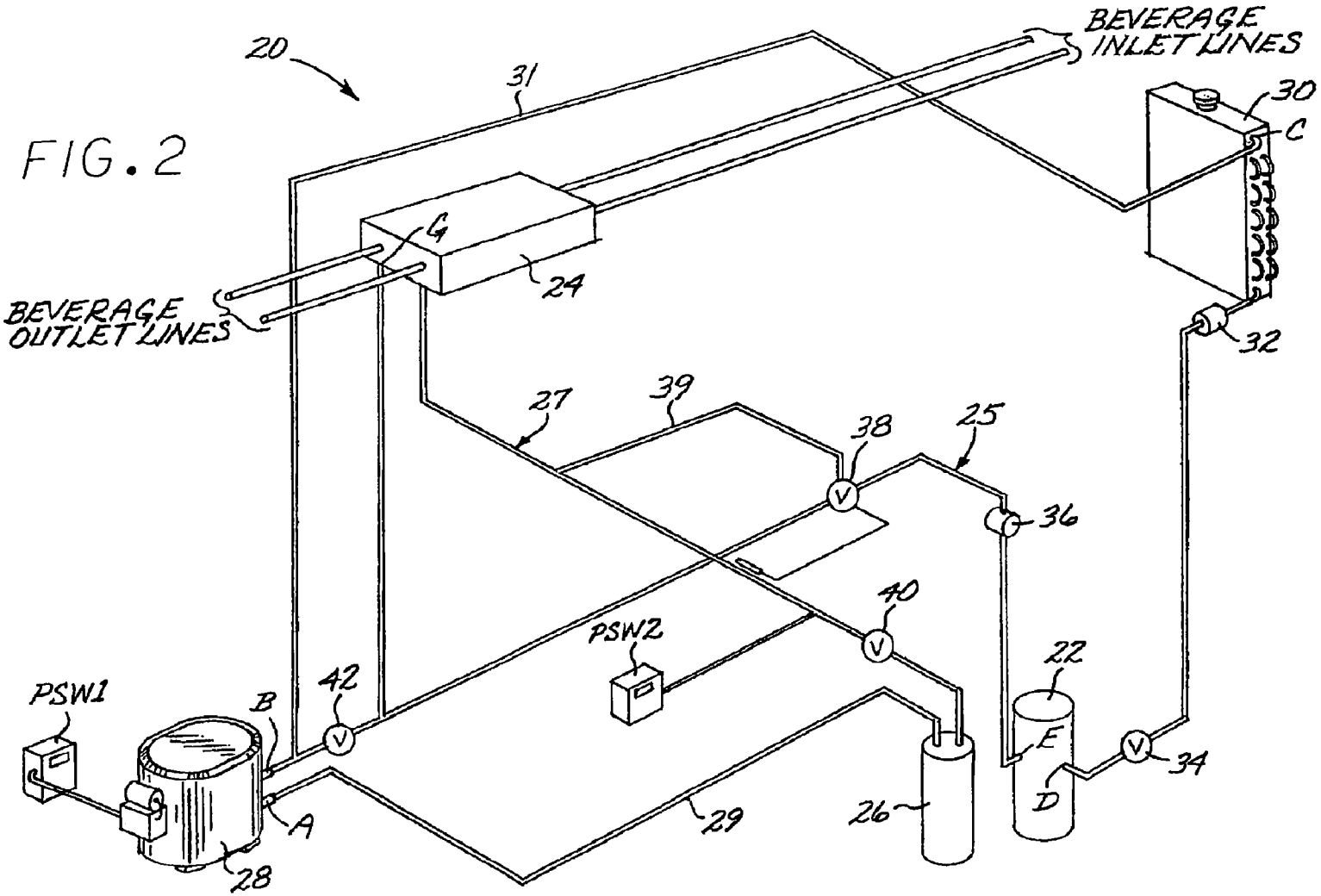
FIG. 2 is a diagram of the refrigerant cooling system of the subject invention.

The refrigerant cooling system 20 of the subject invention is shown in FIG. 2. The cooling system 20 includes receiver 22 which acts as the reservoir for the refrigerant, which is in fluid communication with cold plate 24 via refrigerant line 25. Refrigerant cooling lines extend through cold plate 24 to cool corresponding beverage lines which also extend through cold plate 24. The cold plate utilized is a standard cold plate known to those skilled in the art wherein the beverage and refrigerant lines may be wound within the cold plate to increase the length of the lines positioned within said cold plate. The cooling system 20 also includes accumulator 26, compressor 28 and refrigerant condenser 30. As shown, refrigerant exits the cold plate 24 and flows to accumulator 26 via refrigerant line 27. From the accumulator 26, the refrigerant travels to the compressor 28 via refrigerant line 29. The refrigerant flows from the compressor 28 to the condenser 30 via refrigerant line 31.

The operation of the refrigerant system is described below, in connection with FIGS. 2 and 3.

The refrigerant, in a preferred embodiment type 404a is used, enters the compressor 28 at point A as a low pressure gas and is discharged from the compressor as a high pressure gas at point B. It then enters the top of the condenser 30 at point C.

The refrigerant is cooled in the condenser, exiting it as a high pressure liquid, and passes through a drier 32 (which retains unwanted scale, dirt and moisture) to the liquid line valve 34, which is open whenever the cold plate 24 is warm enough to require cooling, as determined by a pressure switch PSW2.

The refrigerant, still in a high pressure liquid state, flows through the liquid line valve and enters the receiver tank 22, which serves as a storage tank for the refrigerant at point D.

At point E, the refrigerant exits the receiver tank, passes through a sight glass 36 (where bubbles will be observed if the system is low on refrigerant) and encounters the thermal expansion valve 38.

A pressure differential is provided across the thermal expansion valve. This valve includes a sensor bulb that measures the degree of superheat of the suction gas exiting the cold plate and expands or contracts to allow the flow of refrigerant to be varied according to need. The refrigerant leaving the thermal expansion valve will be in a low pressure liquid state.

At the thermal expansion valve 38 there is also a small equalizer tube 39 connected to the outlet of the cold plate 24. The equalizer tube 38 helps to equalize the pressure between the inlet and outlet side of the cold plate 24.

After passing through the thermal expansion valve 38, the refrigerant enters the cold plate 24 at point G. As the liquid refrigerant enters the cold plate it is subjected to a much lower pressure due to the suction created by the compressor and the pressure drop across the expansion valve. Thus, the refrigerant tends to expand and evaporate. In doing so, the liquid refrigerant absorbs energy (heat) from beverage lines within the cold plate 24.

The low pressure gas leaving the cold plate 24 encounters the evaporator valve 40, whose function is to trap refrigerant in the cold plate, thus helping to keep the cold plate cold while it is absorbing heat from the beverage, i.e. beer in a preferred embodiment. From the evaporator valve 40, the gas passes into the accumulator 26, which prevents any slugs of liquid refrigerant from passing directly into the compressor, and continues back to the compressor 28.

The thermal expansion valve 38 mentioned above is used instead of a capillary tube in order to provide improved response to the cooling needs of the cold plate 24.

Figure 3:
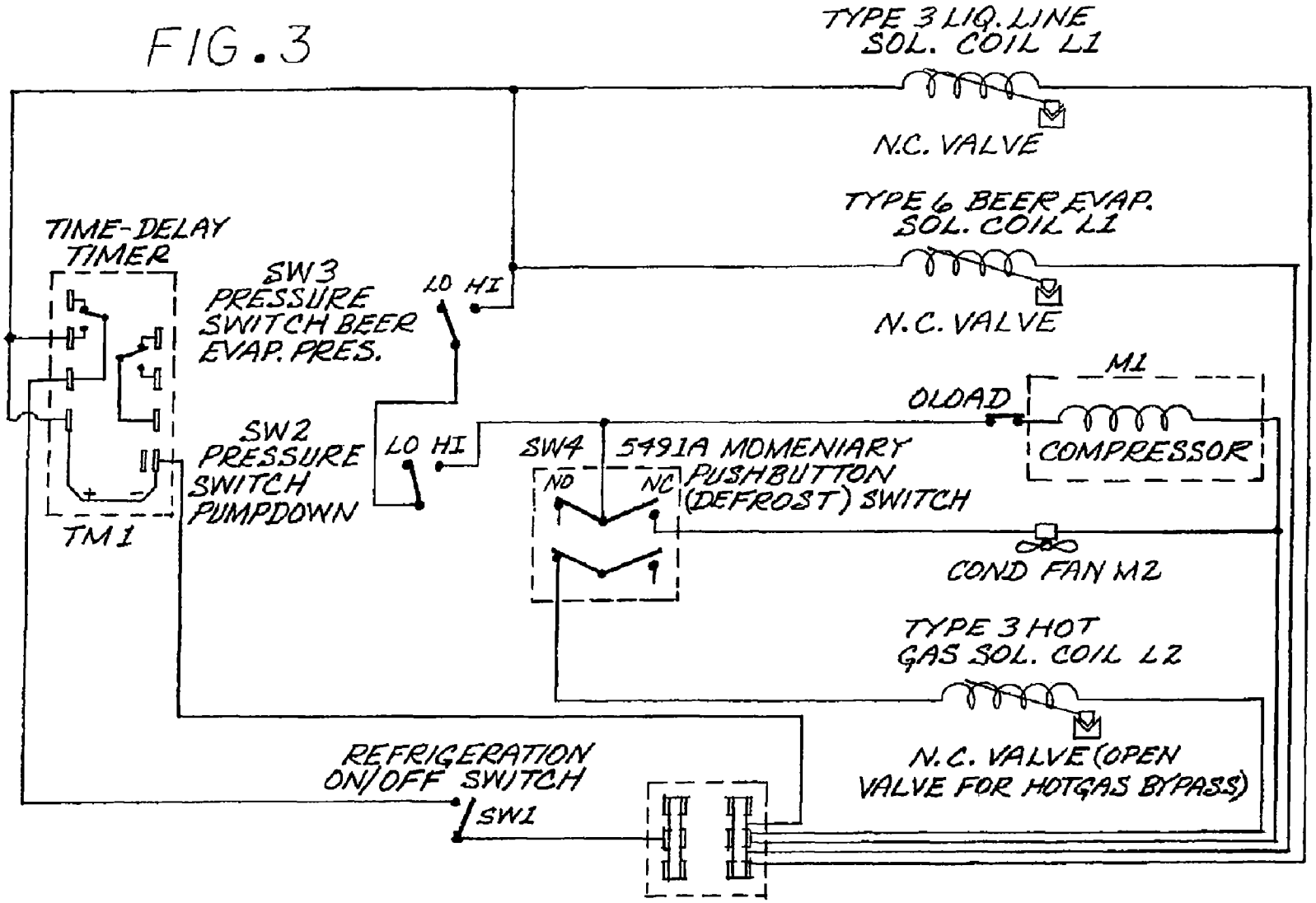
FIG. 3 is a diagram of the electrical control system of the subject invention.

The electrical control system 50 is illustrated in FIG. 3. Refrigeration on/off switch SW1 provides power to the entire system by manually depressing the switch. Pressure switch SW2 monitors the refrigerant pressure in the compressor and cycles of the compressor and condenser fan (not shown) when the pressure drops to a predetermined level, 15 psi in a preferred embodiment, and cycles the compressor and fan back on when the pressure reaches a second predetermined level, 30 psi in a preferred embodiment. The pressure switch PSW2 normally will be set to monitor refrigerant pressure with a range in the low pressure side of the compressor and cycles off the compressor and condenser fan (not shown) when refrigerant pressure drops to approximately 10 to 20 psi and cycles the compressor back on at approximately 25 to 30 psi. Pressure switch SW3 monitors refrigerant pressure in the beverage cold plate. When the pressure drops to a predetermined level, approximately 62-65 psi in a preferred embodiment, pressure switch SW3 cycles off the beverage evaporator coil, liquid line solenoid coil and time delay relay TM-1. When the refrigerant pressure rises to a second predetermined level, approximately 72-75 psi in a preferred embodiment, the switch SW3 cycles on the beverage (beer) evaporator solenoid coil, liquid line solenoid and the time delay relay TM-1. A push-button defrost switch SW4 is provided to cycle on the hot gas solenoid and cycle off the condenser fan to deliver hot gas to the cold plate should the cold plate become frozen.

Pressure switch SW3 responds to the cold plate 24 temperature by reading the pressure of the refrigerant as it is discharged from the cold plate. When the cold plate becomes warm enough the liquid line valve and the evaporator valve open, thereby allowing refrigerant to flow throughout the system. When the cold plate becomes cool enough these valves will close, trapping most refrigerant in the system but allowing gaseous refrigerant to pump from the accumulator into the compressor. Pumping from the accumulator into the compressor extends the life of the compressor by preventing it from having to start against a high pressure differential.

The time delay relay TM-1 causes the liquid line valve and the evaporator valve to remain open for about 10 seconds after the pressure switch SW3 tells them to close. It allows some time for the system to stabilize and prevents short cycling of the compressor.

As shown in FIG. 2, defrost valve 42 is installed between the compressor discharge tube and the cold plate inlet. A manually operated momentary switch SW4 may be deployed to open the defrost valve, which allows high pressure gas from the compressor to be pumped into the cold plate to thaw it, should it freeze up. To prevent damaging the system, the switch should not be held on for more than two minutes.

The refrigerated beverage system described herein is capable of producing 16 ounce draws on a continual basis at a dispensing of temperature of approximately 29° F. based upon a beverage (beer) inlet temperature of 60° F. and ambient room temperature of 70° F.

Figure 6:
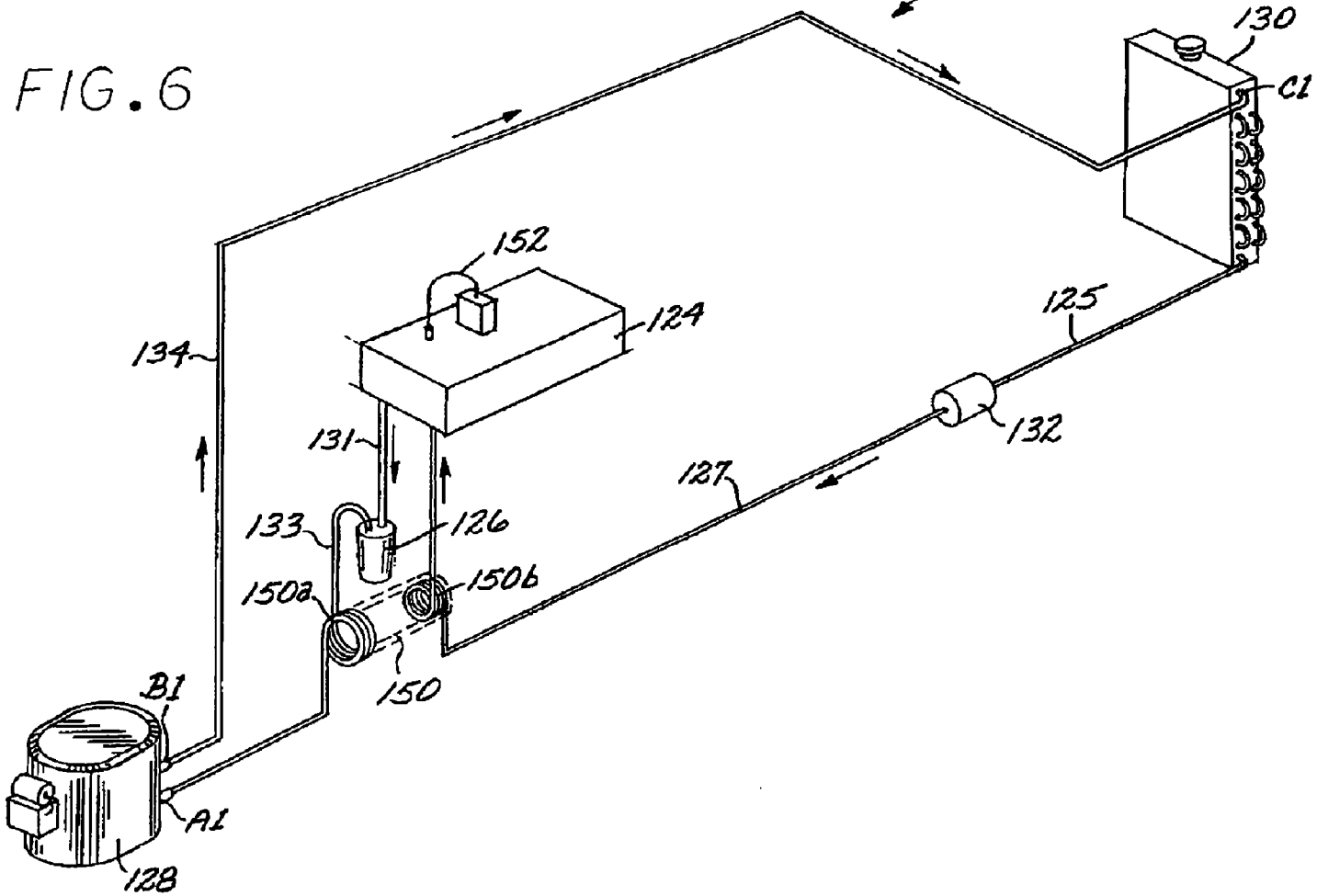
FIG. 6 is a diagram view of an alternative configuration of the refrigerant cooling system of the subject invention.

An alternative configuration of the refrigerant coolant system is shown in FIG. 6. In this embodiment a thermostatic control is provided for controlling the temperature of the liquid being chilled through the cold plate.

The refrigerant cooling system 100 of this embodiment includes refrigerant condenser 130, drier 132, cold plate 124, accumulator 126, heat exchanger 150 and compressor 128. The refrigerant condenser 130 is in fluid communication with cold plate 124 by means of refrigerant line 125 and capillary line 127. As with the embodiment shown in FIG. 2, refrigerant exits cold plate 124 and travels to accumulator 126 by means of refrigerant line 131. The cooling system 100 shown in FIG. 6 is a critical charge type system utilizing just enough refrigerant to fill the system.

As with the prior embodiment, the refrigerant, preferably type 404a, enters the compressor 128 at point $A_1$ as a low pressure gas and is discharged from the compressor as a high pressure gas at point $B_1$. It then enters the condenser at point $C_1$. Compressor 128 is in fluid communication with condenser 130 by means of refrigerant line 134.

The operation of this embodiment of the cooling system is similar to the system described in connection with FIG. 2. Refrigerant is cooled in condenser 130 and exits the condenser as a high pressure liquid, passing through drier 132. From drier 132 the refrigerant flows through capillary line 127 to heat exchanger 150 and from heat exchanger 150 into cold plate 124. As the refrigerant passes through cold plate 124 it cools the liquid flowing through the beverage lines (not shown). The refrigerant then exits the cold plate 124 and flows to the accumulator 126, through heat exchanger 150 and on through to the compressor 128. By passing the refrigerant through heat exchanger 150 as it flows from accumulator 126 to compressor 128 one avoids excess liquid build up in compressor 128.

As shown in FIG. 6, heat exchanger 150 is comprised of coil 150b formed in capillary line 127 and coil 150a formed in refrigerant line 133. Coils 150a and 150b are positioned together in a heat exchange relationship. They may be joined together by soldering, the utilization of shrink wrap or other mechanical means known to those skilled in the art.

The operation of compressor 128 is controlled by thermostatic control 152 which is provided on cold plate 124. Depending upon the desired temperature of the chilled beverage the thermostatic control 152 is set to a pre-determine temperature setting. By way of example, the refrigerant cooling system 100 of this embodiment may be used to produce chilled shots of an alcoholic beverage at 5° F. To produce chilled beverage at this temperature using type 404a in the refrigerant the thermostatic control 152 would be set at to turn on the compressor when the temperature reached 7° F. and turn off the compressor when it reached 3° F., and the compressor pressure would be set at approximately 38 psi. When the thermostatic control senses a cold plate temperature of 7° F., (i.e. the cold plate is warming up) compressor 128 is activated resulting in the discharge of high pressure gas at point B, and the transmission of the refrigerant gas through refrigerant line 134 to condenser 130. When the temperature of cold plate 124 reaches a predetermined temperature, such as 3° F., thermostatic control 152 causes compressor 128 to turn off. One skilled in the art will recognize that the system can be set to differing on and off temperatures depending upon the beverage being chilled or how closely it is desired to maintain the beverage at a predetermined temperature.

Figure 7:
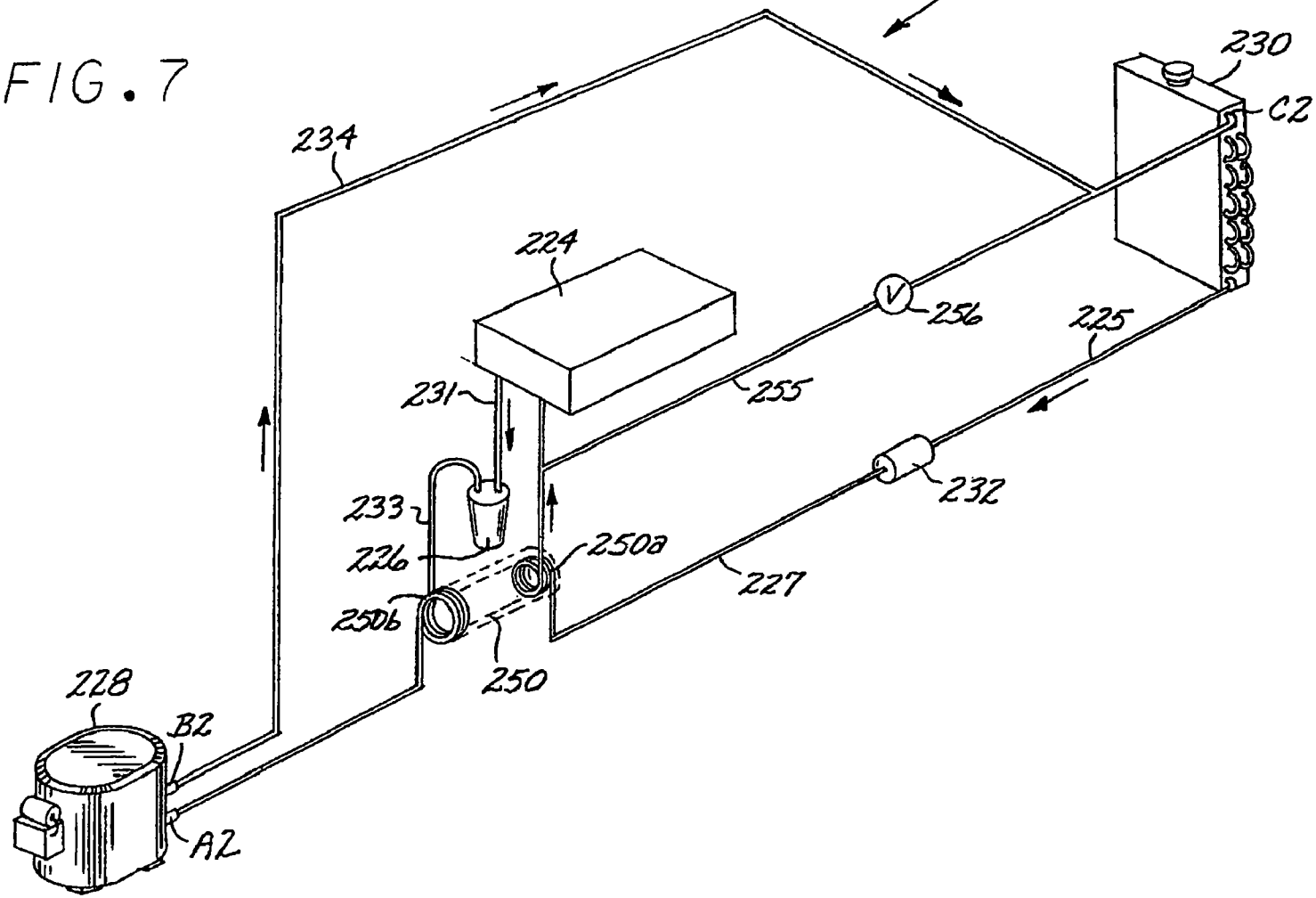
FIG. 7 is a diagram view of a second alternative configuration of the refrigerant cooling system of the subject invention.

Alternatively, rather then using a thermostatic control the temperature of the liquid being chilled can be controlled by means of monitoring the refrigerant hot gas pressure. The refrigerant coolant system monitoring the refrigerant hot gas pressure is shown in FIG. 7.

The refrigerant cooling system 200 of this embodiment includes refrigerant condenser 230, drier 232, cold plate 224, accumulator 226, heat exchanger 250, hot gas valve 256 and compressor 228. The refrigerant condenser 230 is in fluid communication with cold plate 224 by means of refrigerant line 225 and capillary line 227. As with the embodiment shown in FIG. 6, the refrigerant exits cold plate 224 and travels to accumulator 226 by means of refrigerant line 231.

As with the prior embodiment, the refrigerant, preferably type 404a, enters the compressor 228 at point $A_2$ as a low pressure gas and is discharged from the compressor as a high pressure gas at point $B_2$. It then flows to condenser 230 by means of refrigerant line 234 and enters the condenser at point $C_2$.

The operation of this embodiment of the cooling system is similar to the system described in connection with FIG. 6. Refrigerant is cooled in condenser 230 and exits the condenser as a high pressure liquid, passing through drier 232. From drier 232 the refrigerant flows through capillary line 227 to heat exchanger 250 and from heat exchanger 250 into cold plate 224. As the refrigerant passes through cold plate 224 it cools the liquid flowing through the beverage lines enclosed within the cold plate. The refrigerant then exits the cold plate 224 and flows to the accumulator 226, through heat exchanger 250 and then to the compressor 228.

As shown in FIG. 7, bypass line 255 is provided between capillary tube 227 and refrigerant line 234. Hot gas bypass valve 256 is provided in bypass line 255. Depending upon the desired temperature of the chilled beverage as well as the freezing point of the beverage the hot gas valve 256 is set to a pre-determine pressure setting. By way of example, the refrigerant cooling system 200 of this embodiment may be used to produce chilled shots of an alcoholic beverage of 5° F., as well as chill a beverage such as beer to a temperature of 29° F. To produce chilled beverage at a temperature of 5° F. the hot gas valve 256 would be set at a back side pressure of approximately 250-270 psi. To produce chilled beverage at a temperature of approximately 29° F., the hot gas valve would be set at a back side pressure of approximately 150 psi. The cooling system 200 of this embodiment is a critical charge type system in which just enough refrigerant is provided to fill the system with the use of or need for a refrigerant reservoir. In operation, the cooling system operates continuously with refrigerant being continually circulated through the cold plate. This continuous operation could lead to a "freezing up" of the cold plate depending upon the beverage being chilled. This is avoided by the provision of the bypass valve 256 on bypass line 255. Bypass valve 256 is set to open when the back side hot gas pressure reaches a certain predetermined pressure. When the hot gas back pressure reaches the pre-set level, hot gas valve 256 opens and the refrigerant is drawn through bypass line 255 back into the condenser 230 rather than through cold plate 224. This prevents the cold plate from being cooled to a level which would cause the cold plate to freeze the beverage flowing through the beverage lines cast within the cold plate. When the temperature of the cold plate rises to a predetermined level, the change in hot gas back pressure will cause hot gas valve 256 to close. This, in turn, re-introduces the flow of refrigerant through the cold plate 224.

Figure 8:
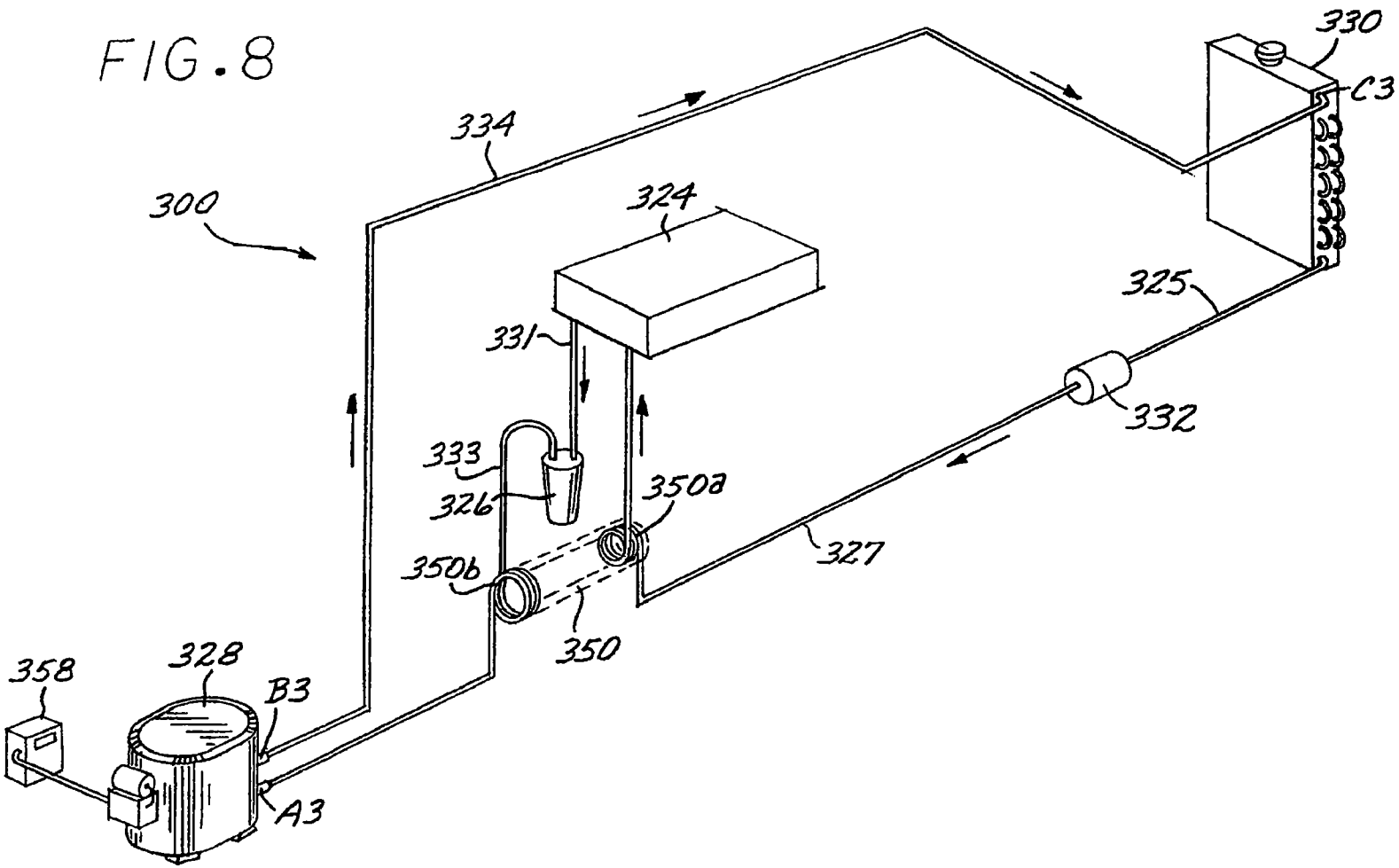
FIG. 8 is a diagram of a third alternative configuration of the refrigerant cooling system of the subject invention.

Yet another refrigerant coolant system is shown in FIG. 8. As shown in this embodiment the temperature of the liquid being chilled is controlled by monitoring the pressure on the suction side of the compressor.

The refrigerant cooling system 300 of this embodiment includes refrigerant condenser 330, drier 332, cold plate 324, accumulator 326, heat exchanger 350 and compressor 328. The refrigerant condenser 330 is in fluid communication with cold plate 324 by means of refrigerant line 325 and capillary line 327. As with the embodiment shown in FIG. 6, refrigerant exits cold plate 324 and travels to accumulator 326 by means of refrigerant line 331. From accumulator 326 the refrigerant flows through heat exchanger 350 to low pressure inlet $A_3$ on compressor 328.

As with the prior embodiment, the refrigerant, preferably type 404a, enters the compressor 328 at point $A_3$ as a low pressure gas and is discharged from the compressor as a high pressure gas at point $B_3$. It then enters the condenser at point $C_3$.

The operation of this embodiment of the cooling system is similar to the system described in connection with FIG. 6. Refrigerant is cooled in condenser 330 and exits the condenser in a high pressure liquid, passing through drier 332. From drier 332 the refrigerant flows through capillary line 327 to heat exchanger 350 and from heat exchange 350 into cold plate 324. As this refrigerant passes through cold plate 324 it cools the liquid flowing through the beverage lines (not shown) enclosed within the cold plate. The refrigerant then exits the cold plate 324 and flows to the accumulator 326 then to the compressor 328.

The operation of compressor 328 is controlled by pressure switch 358 which monitors the pressure on the suction side ($A_3$) of compressor 328. Depending upon the desired temperature of the chilled beverage the pressure switch 358 is set to a pre-determine pressure setting. By way of example, the refrigerant cooling system 300 of this embodiment may be used to produce chilled shots of an alcoholic beverage of 5° F. To produce chilled beverage at this temperature the pressure switch 358 would be set at 39 psi. When the pressure of the refrigerant in gas line 331 on the suction side of the compressor reached 38 psi, switch 358 will turn off the compressor 328. When the pressure reaches a predetermined level pressure switch 358 will turn on the compressor. To avoid unduly taxing the compressor one skilled in the art will know to set the pressure switch 358 to a predetermined pressure range which equates to a predetermined temperature range, by way of example ±2° F.

Figure 9:
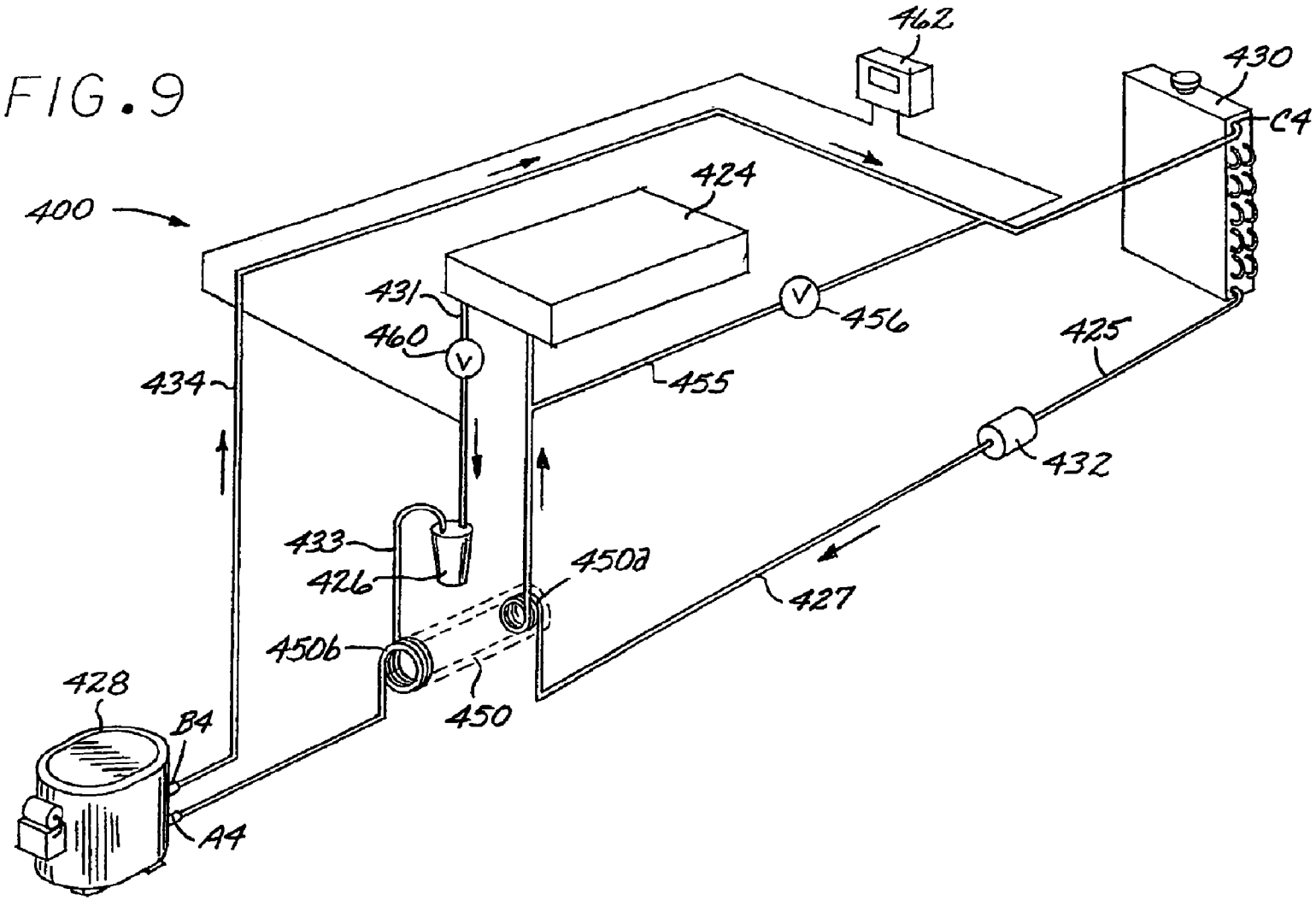
FIG. 9 is a diagram of a fourth alternative configuration of the refrigerant cooling system of the subject invention.

Finally, an additional embodiment of this refrigerant system is shown in FIG. 9. This embodiment is similar to the embodiment shown in FIG. 7. In this embodiment refrigerant cooling system 400 includes refrigerant condenser 430, drier 432, cold plate 424, accumulator 426 and compressor 428. The refrigerant condenser 430 is in fluid communication with cold plate 424 by means of refrigerant line 425, drier 432 and capillary tube 427. As with the prior embodiments, the refrigerant exits the cold plate 424 and travels to accumulator 426 by means of refrigerant line 431. From accumulator 426 the refrigerant flows through heat exchanger 450 to compressor 428. As shown in FIG. 9, pressure regulator 460 is provided between cold plate 424 and accumulator 426. Pressure regulator 460 is controlled by pressure control 462 which allows for adjustment of the system pressure settings to accommodate different beverage temperature settings.

As shown in FIG. 9, bypass line 455 is provided between capillary tube 427 and refrigerant line 434. Hot gas bypass valve 456 is provided in bypass line 455. Depending upon the desired temperature of the chilled beverage the hot gas valve 456 is set to a pre-determine pressure setting. By way of example, the refrigerant cooling system 400 of this embodiment may be used to produce chilled shots of an alcoholic beverage of 5° F., as well as chill a beverage such as beer to a temperature of 29° F. To produce chilled beverage at a temperature of 5° F. the hot gas valve 456 would be set at a back side pressure of approximately 250-270 psi. To produce chilled beverage at a temperature of approximately 29° F., the hot gas valve would be set at a back side pressure of approximately 150 psi. The cooling system 400 of this embodiment is also a critical charge type system in which just enough refrigerant is provided to fill the system with the use of or need for a refrigerant reservoir. In operation, the cooling system operates continuously with refrigerant being continually circulated through the cold plate. As with the hot gas bypass valve system shown in FIG. 7, the continuous operation of cooling system 400 could lead to a "freezing up" of the cold plate depending upon the beverage being chilled. This is avoided by the provision of bypass valve 456 on bypass line 455. Bypass valve 456 is set to open when the back side hot gas pressure reaches a certain predetermined level. When the hot gas back pressure reaches the pre-set level hot gas valve 456 opens and the refrigerant is drawn through bypass line 455 back into the condenser 430 rather than through cold plate 424. This prevents the cold plate from being cooled to a level which would cause the cold plate to freeze the beverage flowing through the beverage lines cast within the cold plate. When the temperature of the cool plate rises to a predetermined level, the change in hot gas back pressure will cause hot gas valve 456 to close. This, in turn, re-introduces the flow of refrigerant through the cold plate 424. To provide greater accuracy or control over the temperature of the system in this embodiment pressure regulator 460 is provided between cold plate 424 and accumulator 426. Pressure regulator 460 allows the operator to control the pressure of the refrigerant as it exits the cold plate which in turn more accurately controls the temperature of the cold plate and the beverage being chilled by the cold plate. By setting the pressure regulator 460 to a certain predetermined pressure one can control the length of time the refrigerant is retained within the cold plate 424 thereby either increasing or decreasing the time the refrigerant is in cooling engagement with the beverage. To increase the time pressure regulator 460 is set at a higher pressure and to decrease the time it is set at a lower pressure. An electronic pressure control unit 462 is provided whereby the operator can more easily set pressure regulator 460 as well as bypass valve 456. Suitable pressure control units, such as those marketed by Alco, are known to those skilled in the art.

In another alternate embodiment of the invention, the cold plate disclosed in co-pending application Ser. No. 10/633,728, for Coil Basket having the same inventor as the subject invention may be utilized. The disclosure of application Ser. No. 10/633,728 is hereby incorporated by reference in its entirety.

Figure 4:
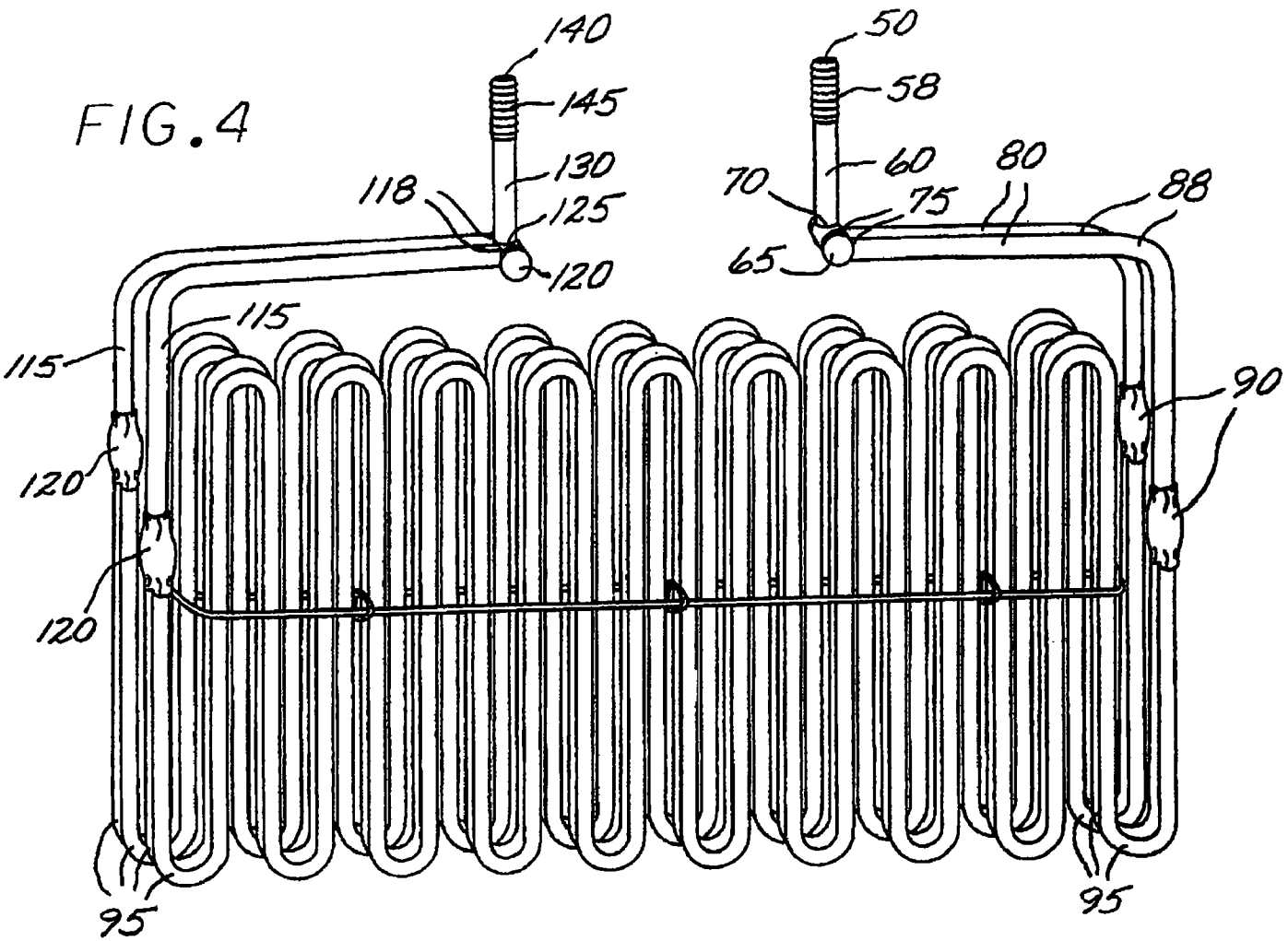
FIG. 4 is a front view of a beverage line coil basket used in the cold plate in one embodiment of the subject invention.
Figure 5:
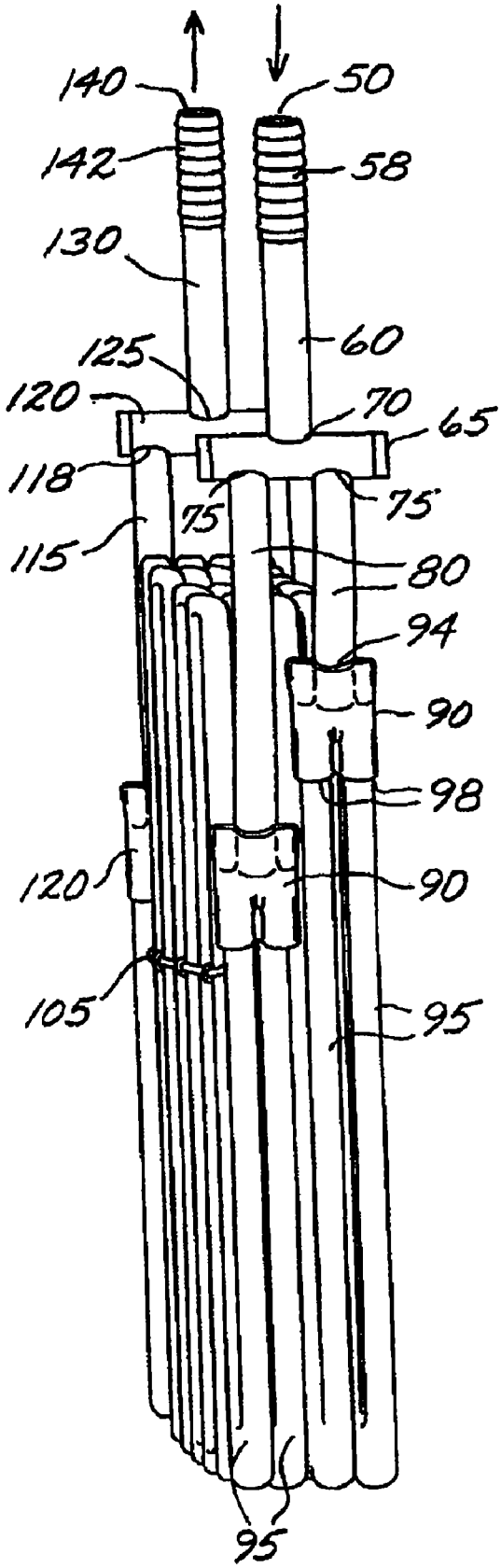
FIG. 5 is an end view of the coil basket shown in FIG. 4.

As show in FIGS. 4 and 5, this cold plate utilizes a beverage line coil basket having a plurality of clips or Y-connectors to take a single inlet line and separate it into a plurality of lines within the cold plate and then reduce the plurality of lines back down to a single outlet line. This allows for greater exposure of the beverage to the refrigerant lines within the cold plate to maximize the cooling effect of the cold plate on the beverage.

The beverage line circulation system shown in isolation in FIGS. 4 and 5 includes an inlet 50 formed with a connector portion 58 that connects to the beverage line. The inlet 50 further includes a straight pipe portion 60 leading to a cylindrical compartment 65 with a longitudinal axis traverse with the longitudinal axis of the straight pipe portion 60. The cylindrical compartment 65 has an inlet 70 at a centered position on its top surface where the straight pipe portion 60 is welded, such that beverage conducted through the straight pipe portion 60 enters and fills the cylindrical compartment 65. The cylindrical compartment 65 includes two outlets 75 on the bottom surface equally spaced from the central inlet location, and each outlet 75 is welded to an intermediate inlet tubing element 80 such that each intermediate inlet tubing element 80 receives an equal distribution of the beverage flow entering the cylindrical compartment 65. Here, the internal diameter of each intermediate segment 80 is smaller compared with the inner diameter of the straight pipe section 65, and the pair of intermediate segments 80 are preferably arranged in a parallel orientation having conforming curvatures forming an elbow section 88. The transition from a single flow through the straight pipe 60 of the inlet 50 to the pair of intermediate segments 80 constitutes a first stage.

The two intermediate segments 80 at the end of the elbow 88 each terminate in a Y-connector or splitter clip 90 that further divides the flow in each intermediate segment 80 into two smaller, beverage tubes 95. Again, the outlets 98 of the Y-connector 90 are spaced equal distant from the inlet 94 so as to equalize the flow between the two beverage tubes 95. It may be necessary to stagger the location of the Y-connecters 90 in the vertical direction as shown in FIG. 5 in order to minimize the profile of the basket 10, since the Y-connectors 90 have a width greater than the width of two beverage tubes 95. Placing the two Y-connectors 90 at the same vertical location could unnecessarily widen the basket 10 at that point, so slightly staggering the position of the Y-connectors provides a more compact configuration. The creation of the four beverage lines 95 from the two intermediate segments 80 comprises the second stage.

The four beverage tubes 95 are preferably arranged substantially in a common plane as shown in FIG. 5, and assimilate into the grouping of the refrigerant conducting tubes. Because the beverage flow has been reduced in two stages, each stage exactly doubling the lines of the previous stage, the resultant flows are equally balanced and each beverage (beer) line is subjected to the same heat exchanging conditions.

The four tubes 95 conducting the beverage converge into two intermediate outlet segments 115 in the same manner as that described for the inlet stage two. That is, two Y-connectors 120 each consolidate two beverage tubes 95 into an intermediate segment 115 having an inner diameter larger than the inner diameter of the heat exchanger tubes 95. The two intermediate outlet segments 115 feed to a cylindrical compartment 120 along a bottom surface thereof, where the inlets 118 to the cylindrical compartment 120 are equally spaced from a centrally disposed outlet 125. The outlet 125 feeds a single straight pipe section 130 leading to beverage outlet 140 of the cold plate with connector portion 142 that carries the end of a beverage line connecting the cold plate with beverage dispenses 10a, b shown in FIG. 1.

In describing the above beverage circulating system, the term Y-connector or splitter should be interpreted broadly as any fluid dividing member that has either one inlet line and two outlet lines, or two inlet lines and one outlet. Thus, the cylindrical compartments described with respect to the first stage division and consolidation should be considered Y-connectors for purposes of this application. Likewise, clips or other flow dividers that provide a 2 for 1 flow division or flow consolidation are also properly considered Y-connectors.

Each stage of the beverage flow subdivision is preferably accompanied by a reduction in the inner diameter of the downstream tubing, but in a preferred embodiment the cross-sectional area of the two downstream tubing is greater than the cross sectional area of the upstream tubing. This increase in the flow capacity of the downstream tubing results in a slowing of the fluid flow through the cold plate leading to more efficient heat exchange conditions. That is, the resident time for the beverage in the cold plate is increased and thus the efficiency of the heat exchange is improved when compared to faster moving beverage flow.

While the description above discloses two stages of beverage subdivision forming four discrete beverage tubes 95, the present invention can be expanded to a third stage of subdivision wherein the four beverage tubes are replaced with four transitional tubes that each incorporate a Y-connector at a staggered position with respect to each other to yield eight individual beverage conducting tubes in a manner similar to that described above. Employing eight beverage lines increases the available contact area with the refrigerant conducting lines and can further slow the flow of beverage in the manner described above. However, machining smaller tubes can be more expensive and increase the overall cost of the cold plate. Further, because the walls of the tubing are minimized in the beverage portion of the basket to facilitate heat transfer, smaller tubes may be susceptible to crimping which can block flow and negatively impact heat transfer. Those skilled in the art will recognize that additional stages of subdivision can be provided to allow for additional beverage lines if desired. The ultimate number of beverage lines N can be characterized as N=2s, where S is the number of stresses and S is greater or equal to 2.

It is to be understood that the subject invention is not to be limited to the specific embodiment disclosed herein but is to be accorded the full breadth and scope of the appended claims.

I claim:

[1. A beverage dispensing cooling system for dispensing chilled beverages comprising:

a refrigerant condenser;

a cold plate;

a heat exchanger;

an accumulator;

a compressor; and a bypass valve positioned within a bypass line positioned between the heat exchanger and the cold plate, wherein said cooling system is filled with a critical charge of refrigerant and further wherein said cooling system operates continuously with the refrigerant circulating through the system and wherein said bypass valve is set to a predetermined back pressure and upon aid pressure being reached said bypass valve opens and diverts the flow of refrigerant from the cold plate to the condenser.]

[2. The beverage dispensing cooling system of claim 1 further including a pressure regulator to control the pressure of the refrigerant as it exits the cold plate.]

[3. The beverage dispensing cooling system of claim 2 further including means for controlling said pressure regulator and said bypass valve.]

*4. A beverage dispensing cooling system for dispensing chilled beverages comprising:*

*a refrigerant condenser;*

*a beverage cooling unit;*

*an accumulator;*

*a compressor;*

*a receiver tank;*

*a pressure switch;*

*an evaporator valve in fluid communication with the accumulator and the beverage cooling unit; and*

*a line valve in fluid communication with the refrigerant condenser and the receiver tank;*

*wherein the pressure switch monitors pressure of refrigerant between the beverage cooling unit and the accumulator, and the pressure switch causes the evaporator valve and the line valve to open and close in response to the monitored pressure, to control circulation of refrigerant within the cooling system.*

*5. A beverage dispensing cooling system as defined in claim 4, wherein the system further comprises a time delay relay in communication with the evaporator valve and the line valve.*

*6. A beverage dispensing cooling system as defined in claim 4, wherein the system further comprises a defrost valve in between the compressor and the beverage cooling unit.*

*7. A beverage dispensing cooling system as defined in claim 6, wherein the system comprises a defrost switch which, when deployed, causes the defrost valve to open.*

*8. A beverage dispensing cooling system as defined in claim 7, wherein the defrost switch is a manually-operable switch.*

*9. A beverage dispensing cooling system as defined in claim 4, wherein the system further comprises a thermal expansion valve in between the receiver tank and the beverage cooling unit.*

*10. A beverage dispensing cooling system as defined in claim 4, wherein the system further comprises a compressor pressure switch in communication with the compressor, the compressor pressure switch causing the compressor to turn on and off as pressure of refrigerant flowing into the compressor falls and rises.*

*11. A beverage dispensing cooling system as defined in claim 4, wherein the cooling system is contained within a housing.*

*12. A beverage dispensing cooling system as defined in claim 4, wherein when the evaporator valve and the line valve close, gaseous refrigerant is pumped from the accumulator into the compressor until the compressor pressure switch shuts off the compressor.*

* * * * *